United States Patent [19]

Tsujimoto et al.

[11] Patent Number: 5,877,252

[45] Date of Patent: Mar. 2, 1999

[54] WATERBASED MICROSPHERE ADHESIVES FOR SHEET-TO-SHEET COATING PROCESS

[75] Inventors: Kim K. Tsujimoto, New Brighton; Mark S. Vogel, Maplewood, both of Minn.; Eric Francis Yves Baertich, Paris, France

[73] Assignee: Minnesota Mining and Manufacturing Company, St. Paul, Minn.

[21] Appl. No.: 858,299

[22] Filed: May 19, 1997

Related U.S. Application Data

[63] Continuation of Ser. No. 543,958, Oct. 17, 1995, abandoned.

[51] Int. Cl.⁶ .................................. C08J 3/21; C08J 3/26
[52] U.S. Cl. ........................... 524/523; 523/219; 524/492; 524/493; 524/494; 524/745; 524/831; 524/832
[58] Field of Search ............................ 523/219; 524/492, 524/493, 494, 831, 523, 745, 832

[56] References Cited

U.S. PATENT DOCUMENTS

| | | | |
|---|---|---|---|
| 3,121,021 | 2/1964 | Copeland | 428/219 |
| 3,691,140 | 9/1972 | Silver | 526/240 |
| 4,166,152 | 8/1979 | Baker et al. | 428/522 |
| 5,053,436 | 10/1991 | Delgado | 521/64 |
| 5,378,405 | 1/1995 | Gutman et al. | 252/62 |

FOREIGN PATENT DOCUMENTS

| | | |
|---|---|---|
| 0 439 941 A1 | 8/1991 | European Pat. Off. . |
| WO 94/19419 | 9/1994 | WIPO . |

OTHER PUBLICATIONS

A. Pocius and C. Dahlquist, *Adhesion and Adhesives*, 1986 ACS (p. 38).

*Primary Examiner*—Marion McCamish
*Assistant Examiner*—John J. Guarriello
*Attorney, Agent, or Firm*—Carolyn V. Peters

[57] ABSTRACT

This invention describes water-based microsphere adhesive formulations to be used in the sheet-to-sheet coating process. These adhesives have proven to have excellent wet-out of a difficult, high-energy surface, good shear stability to allow die-coating or gravure-coating of the adhesive onto an intermediate carrier belt, good elasticity to allow the wet adhesive to cling to the intermediate belt until it is dried (or partially dried), good integrity to allow complete transfer from the intermediate carrier belt onto the final substrate, and repositionable properties in a final product composition.

5 Claims, No Drawings

WATERBASED MICROSPHERE ADHESIVES FOR SHEET-TO-SHEET COATING PROCESS

This is a continuation of application Ser. No. 08/543,958, filed Oct. 17, 1995 now abandoned.

TECHNICAL FIELD

This invention relates to repositionable adhesives and in particular to repositionable adhesives containing microspheres wherein the adhesives are particularly useful for sheet-to-sheet coating processes.

BACKGROUND OF THE INVENTION

During the past decade, repositionable products, such as Post-it® Notes and related products, commercially available from 3M Co., have become virtually indispensable consumer and business office items. The commercial success of these products can be attributed to repositionable, elastomeric, polymeric microsphere adhesives, see for example, U.S. Pat. Nos. 3,691,140 and 4,166,152.

Typically, coating such microsphere adhesives onto paper is accomplished by using a direct coating process. However, stripe coating of water-based adhesives onto paper is often difficult and produces unsatisfactory results due to paper distortions. One way of avoiding paper distortion, or as it is often referred to "cockling" is to transfer coat dry adhesive as stripes.

Although transfer coating (indirect coating) of adhesive is generally known, see for example U.S. Pat. No. 3,121,021, problems associated with coating a particulate or particulate-containing adhesive (such as a microsphere or microsphere-containing adhesive) have not been recognized in the art dealing with film forming adhesives.

Some sheet-to-sheet coating process, which continuously coat a pseudo-web of overlapping paper sheets, use water-based adhesives. The adhesives are coated onto a silicone belt. The adhesive is then dried (either partially or fully) on the belt and transferred to the pseudo-web of sheets. However, the adhesive materials used do not satisfactorily transfer cleanly and with consistency. Various solutions have been proposed to aid in transferring adhesives from a coating intermediate carrier to a moving web, but to date all have been relatively unsuccessful.

Although microsphere adhesive formulations including binder, surfactant and thickeners are known, formulations which meet the special transfer coating process needs (as enumerated above), are not known.

SUMMARY OF THE INVENTION

Briefly, in one aspect of the present invention waterbased microsphere adhesive formulations are provided for use in a sheet-to-sheet transfer coating process. These formulations comprise a combination of microsphere adhesive, binder, surfactant, viscosifier and water. Advantageously, the adhesives of the present invention provide excellent wet-out on the surface of a low surface energy intermediate carrier belt (transfer medium), as well as excellent transfer characteristics from the intermediate carrier belt onto a final substrate. A further advantage of the present invention is that the adhesive formulations are shear stable to allow die-coating or gravure-coating of the adhesives onto a intermediate medium. Furthermore, these adhesives also overcome the challenge of retaining their unique topology throughout the coating and transferring process (during which they are turned upside-down onto the final substrate).

The adhesive formulations provided by this invention are useful in the coating of repositionable note products. A particularly advantageous feature of the present invention is that the adhesives are water-based rather than solvent based. The elimination of solvents nullifies fire and health hazards that many be present in solvent-based adhesives. Further, many adhesives do not have the topology provided by the microspheres and thus do not perform as removable, repositionable adhesives.

Adhesive formulations provided by this invention are particularly useful in a sheet-to-sheet coating process, such as the process described in U.S. Pat. No. 08/196,490, filed Feb. 15, 1994 (corresponding PCT WO-EP94/00421). In general, the process comprises the steps of (a) coating an adhesive solution onto an intermediate carrier belt, (b) fully or partially drying the adhesive, and (c) transferring the dried adhesive from the intermediate carrier web onto sheets of paper that are overlapped into a pseudo-web that travels by the transfer belt under laminating pressure. These sheets can then be converted into repositionable note products.

A particularly useful water based adhesive composition comprises:

(a) 60–65 weight % of polymeric microspheres,
(b) 0.01–25 weight % of acrylic latex binder,
(c) 0.01–5.0 weight % of surfactant,
(d) 0.01–3.0 weight % of a thickener, and
(e) sufficient amount of de-ionized water, such that the weight % is equal to 100 weight %.

Preferably, the % solids in the formulation ranges from 20 to 60 and the ratio of microsphere to binder is in the range of 4:1 to 7000:1 and the formulations comprise: (a) 60–65 weight % of polymeric microspheres, (b) 2–5 weight % of acrylic latex binder, (c) 0.1–1.5weight % of surfactant, (d) 0.1–1.5 weight % of a thickener, and (e) sufficient amount of de-ionized water, such that the weight % is equal to 100 weight %.

Adhesive formulations of the present invention are particularly useful in this process because of several advantageous characteristics, such as (a) the ability to wet-out a low surface energy intermediate carrier belt (such as a silicone belt), (b) shear stability, thus permitting die-coating or gravure coating of these formulations onto the intermediate carrier belt without coagulation, (c) sufficient integrity to remain on the intermediate carrier belt in its coated state, that is, the adhesive does not flow down the belt until it is dried (partially or fully) and/or transferred off of the intermediate carrier belt, that is, an adhesive with a viscosity in the range of 400 to 100 centipoise, would not tend to flow down the low energy intermediate carrier belt, (d) sufficient elasticity to remain cohesive, and yet not too much as to prevent homogeneous and total transfer off of the intermediate onto the final substrate (usually pre-coated paper) and (e) adhesive removability, repositionability, both initially and after being aged under different aging conditions. In addition to the advantages cited above, these adhesives can be directly coated onto paper (both onto dry and non-dry precoated paper), producing a flat, repositionable note product.

DESCRIPTION OF THE PREFERRED EMBODIMENT(S)

During the past decade, Post-it® Notes and related products (commercially available from the 3M Company) have become indispensable consumer and business office items. One of the advantages of these products is repositionability. Such repositionability is generally believed to be a result of the adhesive applied to the paper substrate. Many of the repositionable products are coated with an adhesive comprising solid, elastomeric polymeric microspheres. Such microsphere containing adhesives are described in U.S. Pat. Nos. 3,691,140 and 4,166,152.

In the present invention, microspheres are used in combination with a water-based binder. Binder was generally used to prevent adhesive transfer of the microspheres. Useful binders are those that provide tack and mechanical locking, as well as the additional advantage of providing superior aging characteristics. Furthermore, useful binders are able to bind adhesive microspheres together such that repositionability of the final product is maintained whether the adhesive is coated directly or by a transfer process. Typically, the microsphere to binder ratio is in the range of 4:1 to 7000:1.

Typically, such adhesives are coated directly onto the final substrate and the microspheres are then raised above the surface of the binder, giving rise to repositionability characteristics. However, in a transfer process, these sockets would end up upside-down, with the microspheres next to the substrate with the conventional binder adhesive exposed.

In addition to the microspheres and binders, a surfactant, such as Surfynol 336 (commercially available from Air Products and Chemicals, Inc.) can be included in the adhesive formulations, although surfactants are typically not added to adhesive formulations as this usually causes the adhesive properties to decrease, see for example EP 0 439 941 A1. However, in the adhesive formulation described hereinabove, a surfactant is included in the adhesive formulations so that the adhesives provide good wet-out of the silicone intermediate carrier belt, without the characteristic decrease in adhesive properties. If used, a surfactant is present in an amount sufficient to provide effective wet-out of the adhesive formulation and such sufficient amounts tend to be in the range of 0.01–5.0 parts by weight (or % by weight).

Furthermore, a thickener, such as Polyphobe 101 (commercially available from Union Carbide and Plastics Company Inc. Cary, N.C.) can also be included in these adhesive formulations. Such an addition can be beneficial for transfer-coating process. Viscosifiers are often added to adhesive compositions to optimize coatability of the adhesives. It is generally believed that the addition of the thickener to an adhesive formulation will permit coating the formulation by methods such as die or gravure methods. Furthermore, it is believed that an appropriate viscosity aids in the clean and non-elastic transferrence from the intermediate carrier belt onto a substrate web. If used, a thickener is present in an amount sufficient to provide effective adhesive coating, such as die or gravure coating methods of the adhesive formulation and such sufficient amounts tend to be in the range of 0.01–3.0 parts by weight (or % by weight).

The objects, features and advantages of the present invention are further illustrated by the following examples, but the particular materials and amounts thereof recited in these examples, as well as other conditions and details, should not be construed to unduly limit this invention. All materials are commercially available or known to those skilled in the art unless otherwise stated or apparent.

EXAMPLES

Example 1
Preparation of Polymeric Microspheres

This example illustrates a general method by which solid; infusible, inherently tacky, elastomeric, polymeric microspheres are prepared. To a one (1) liter, 3-necked flask equipped with a thermometer, a reflux condenser, a mechanical stirrer and a gas inlet tube were charged 300 grams of deionized water, 100 grams of isooctyl acrylate, 2.5 grams of acrylic acid, 0.25 gram of 98% active benzoyl peroxide (commercially available from the Pennwalt Corporation under the tradename of Lucidol 98) and 4.2 grams of ammonium laurel sulfate (commercially available from the Stepan Company under the tradename of Stepanol AMV). Concentrated ammonium hydroxide was added until a pH of 7.0 was obtained. Agitation of the mixture was set at 500 revolutions per minute (rpm) and the reaction mixture was purged with nitrogen. The stirring and nitrogen purge were maintained throughout the reaction period. The reaction mixture was allowed to stir at room temperature for 15 minutes and then was heated to 75° C. to initiate the reaction. The reaction became exothermic after about 30 minutes, and after the exotherm had subsided, the batch was heated to 75° C. for 12 hours. The reaction mixture was cooled to room temperature and filtered through a 16 mesh screen. The resulting suspension was found to be about 25% in solids, with the average size of the polymeric microspheres being 40 micrometers ($\mu$m).

Example 2
Preparation of Microsphere Concentrate

The material from Example 1 was allowed to stand overnight in a separatory funnel (approximately 8–12 hours). This resulted in the formation of two phases, wherein the upper phase was the microsphere concentrate and the lower phase was mother liquid. The mother liquid was drained off and discarded, and provided a fluid microsphere concentrate containing about 50% solids. When the mixture was allowed to separate for a longer time (>16 hours), the microsphere concentrate contained approximately 70% solids.

Example 3

This example illustrates the methods by which the adhesives of this invention are formulated. To a container were added and stirred together 64.4 grams of the microsphere concentrate from Example 2, and 3.6 grams of "Rhoplex N580" binder (commercially available from Rohm and Haas). To this mixture was added 31 grams of a mixture of 30.9 grams deionized water and 0.9 grams of "Surfynol 336" surfactant (commercially available from Air Products), slowly, while stirring. Finally, 1.0 grams of "Polyphobe 101" thickening agent (commercially available from Union Carbide) was added to the adhesive mixture, slowly, while stirring. The resulting adhesive composition was neutralized with ammonium hydroxide to a pH of at least 7.5. This adhesive had a solids content of approximately 35%.

Example 4

This example illustrates the coating method by which the adhesives of this invention are tested. An adhesive, such as that described and formulated as in Example 3, was coated onto a silicone-coated fiberglass belt material with sufficiently low surface energy as to be deemed a release material, using a knife coater at a coating orifice of between 2 and 4 mils. The initial determination made was whether the adhesive formulations would "wet-out" this low-energy surface sufficiently so that the coated adhesive rather than "bead-up" before it dries. The adhesive formulations were dried at room temperature.

Once dried, the adhesive formulations were evaluated as to the ease and completeness of transfer from the intermediate carrier belt. This was done by performing a "Belt Adhesion" test as described below. This test involved placing a 1" wide strip of Magic™ Tape perpendicularly across a dried adhesive stripe (so that the ends of the tape strip are not in contact with the adhesive). The tape strip was then laminated to the dried adhesive stripe using finger pressure or a 4-lb roller once across the belt. The tape strip was then lifted off of the belt, taking the dried adhesive with it. The force required to do this (using a Chatillion gauge or Instron machine) was measured. The thoroughness (cleanness) of the transfer was also noted.

The adhesives described in Example 3 sufficiently wet out the surface of the low-energy silicone belt and did not bead-up before drying occurs (approximately 30 seconds). The force to remove the laminated strip of Magic™ Tape (the Belt Adhesion) was about 10 grams and the transfer was easy and complete.

Example 5

The adhesives listed in Table I were formulated as described in Example 3, but different thickeners and surfactants were used in these formulations. Table 2 summarizes the results from Belt Adhesion tests performed as described in Example 4, for all the adhesives listed in Table 1. The adhesive described in Example 3 is identified as "6C". Reviewing the data in Table 2, it can be seen that none of these other combinations of surfactants and thickeners provided the necessary adhesive properties such as sufficient wet-out of the low energy surface (>30 secs) and easy, complete transfer of the dried adhesive (<10 grams, clean transfer). These additional adhesives further illustrate the novelty of the adhesives in this invention (as described by Example 3), by showing the importance of choosing the correct surfactant-thickener combination.

Example 6

The adhesives listed in Table 1 were allowed to stand for 2 days with no jarring of the containers, to study the creaming/settling of the formulations. Samples of the creamed/settled adhesives were taken from both the top and the bottom layers and tested for % solids; the results are summarized in Table 1. These results show that few surfactant/thickener combinations yield adhesives that have the unique quality of being more stable to creaming and settling. Table 3 shows that only adhesives 4B, 5B and 6C (Example 3) show minimal settling/creaming. Of these three adhesives, however, 4B and 5B do not meet the necessary performance criteria for these adhesives, as illustrated by the results in Table 2, and in Example 5.

In addition to these adhesives, modified adhesives were formulated to observe the effects of thickener alone, surfactant alone, and thickener and surfactant acting together. These adhesives were formulated as in Example 3, with the indicated modifications. Creaming/settling results for these modified adhesives are summarized in Table 4. Upon review of the data summarized in Table 4, a combination of the chosen thickener and surfactant (in this invention) provided these stabilizing characteristics.

Critical Surface Energy of Silicone Transfer Belts

In addition to evaluating the adhesive formulations, the intermediate carrier belt was evaluated to determine the contribution of the belt on the transfer process of the adhesive formulations of the present invention. The critical surface energy, $\gamma_C$, for different silicone transfer belts was measured to determine if there existed a maximum surface energy for a transfer belt to successfully work in a sheet to sheet process, such as the one described in U.S. Ser. No. 08/196,490, filed Feb. 15, 1994. Six (6) different belt surfaces were measured.

Measurement of $\gamma_C$

Zisman Plots can be used to determine critical surface energy values by plotting cos θ (where θ is the contact angle of a liquid) vs. $\gamma_{LV}$ (where $\gamma_{LV}$ is the surface tension of the same liquid from the literature). The γC is the point at which $\gamma_{LV}$ equals 1.0. See Adhesion and Adhesives by A. Pocius and C. Dahlquist (1986, ACS), Four solvents with different surface tensions were selected:

| Solvent | γc |
| --- | --- |
| water | 72.8 |
| formamide | 58.2 |
| diethyl phthalate | 37.5 |
| hexadecane | 27.6 |

Contact angles of these solvents on the 6 different belts were measured. Zisman plots were made from this data and the graphs were extrapolated to find where $\gamma_{LV}$ equals 1.0.

Belts Studied

The six different belts studied and their properties are summarized in the following table. The belts all consist of a backing of some type, commercially available from J. P. Stevens Company, under the specified trade names.

| Belt ID | Belt Side | Backing | Coating | Wet Out | Transfer | γc |
| --- | --- | --- | --- | --- | --- | --- |
| MSRG8 | NA | fiberglass 1523-18 oz | Dow Corning 25630 white | good | poor (leaves pattern) | 15.98* |
| MTMP | matte side | fiberglass 3116 | Dow Corning 25630 white | great | great | 17.55 |
| MTMP | shiny side | fiberglass 3116 | Dow Silicone SL5000 | none | NA | 17.62 |
| MSRG6 | NA | fiberglass 1523-16 oz | Dow Corning 25630 white | good | poor (leaves pattern) | 17.71* |
| R1 | outside | cotton | silicone rubber | good | poor | 21.53 |
| R2 | inside | cotton | silicone rubber | good | better than outside | 22.29 |

* Difficult to measure because of heavy pattern of belt

There did not appear to be a large difference between the critical surface energy of the two sides of the current belt. The matte side is the side presently used in the sheet to sheet process and the shiny side did not allow for adhesive wet-out. All belts with less-than-excellent wet-out have $\gamma_C$ values of greater than 17.55, the $\gamma_C$ value of the current belt that allows excellent wet-out of our adhesive (the $\gamma_C$ value for MSRG8 is an estimate since the heavy belt pattern makes contact angle measurements difficult and often meaningless) but since the belts other than the non-wetting shiny side of the 3M belt have $\gamma_c$ values that are higher than the shiny side, it is difficult to ascertain the ideal $\gamma_C$ for transfer belts in general.

Surfactants:

Non-Ionic

| | | |
|---|---|---|
| NISA | acetylenic diol blend | commercially available from Air Products under the trade name of Surfynol ® 336 |
| NISB | alkyl phenoxy poly (oxyalkyene) alkanol | commercially available from Rhone Poulenc under the trade name of Igepal ® CO-710 |
| NISC | mixture of fluorinated and non-fluorinated polyoxethylene ethanols | commercially available from 3M under the trade name of FC-170C |

Anionic

| | | |
|---|---|---|
| ASA | sodium dodecyl benzene sulphonate | commercially available from Rhone Poulenc under the trade name of Rhodacal ® DS-4 |
| ASB | potassium fluorinated alkyl carboxylate | commercially available from 3M under the trade name of FC-129 |
| ASC | ammonium laurel sulphate | commercially available from Henkel Corporation under the trade name of Standopol A |

Thickeners:

| | | |
|---|---|---|
| TA | xanthan gum | commercially available from Kelco (a division of Merck) under the trade name of Kelzan |
| TB | poly acrylic acid | commercially available from Rohm and Haas under the trade name of ASE-95 |
| TC | associative thickener; alkali-soluble, alkali-swellable urethane | commercially available from Union Carbide under the trade name of UCAR ® Polyphobe ® 101 |

TABLE 1

Percent Solids of Adhesives With Different Surfactant/Thickener Combinations

| Adhesive Example | Surfactant | Parts by Weight | Thickener | Parts by Weight | Upper Layer % Solids | Lower Layer % Solids |
|---|---|---|---|---|---|---|
| 1A | ASC | 0.9 | TA | 1.0 | 54 | 0.6 |
| 2A | ASB | 0.9 | TA | 1.0 | 43 | 0.02 |
| 3A | ASA | 0.9 | TA | 1.0 | 21.8 | 11.4 |
| 4A | NISC | 0.9 | TA | 1.0 | 47.7 | 9.8 |
| 5A | NISB | 0.9 | TA | 1.0 | 49.3 | 7.7 |
| 6A | NISA | 0.9 | TA | 1.0 | 76.7 | 8 |
| 1B | ASC | 0.9 | TB | 1.0 | 40 | 23.5 |
| 2B | ASB | 0.9 | TB | 1.0 | 35.2 | ~100 |
| 3B | ASA | 0.9 | TB | 1.0 | 37.2 | 35 |
| 4B | NISC | 0.9 | TB | 1.0 | 39.7 | 37 |
| 5B | NISB | 0.9 | TB | 1.0 | 39 | 38.6 |
| 6B | NISA | 0.9 | TB | 1.0 | — | — |
| 1C | ASC | 0.9 | TC | 1.0 | 73 | 6 |
| 2C | ASB | 0.9 | TC | 1.0 | 56.5 | 74 |
| 3C | ASA | 0.9 | TC | 1.0 | 67.1 | 6 |
| 4C | NISC | 0.9 | TC | 1.0 | 57 | 6 |
| 5C | NISB | 0.9 | TC | 1.0 | 64.5 | 6.6 |
| 6C | NISA | 0.9 | TC | 1.0 | 58.27 | 22.4 |

TABLE 2

Wet-out and Belt Adhesion Test Results of Different Adhesive Formulations

| Example | Time to Bead | Belt Adhesion | Adhesive Transfer |
|---|---|---|---|
| 1A | <3 sec | — | — |
| 2A | >30 sec | 15 g | clean |
| 3A | <8 sec | — | — |
| 4A | <13 sec | — | — |
| 5A | <5 sec | — | — |
| 6A | <3 sec | — | — |
| 1B | <8 sec | — | — |
| 2B | >30 sec | 20 g | fairly clean |
| 3B | <5 sec | — | — |
| 4B | >30 sec | 25 g | clean |
| 5B | <8 sec | — | — |
| 6B | ~30 sec | 15–20 g | stringy |
| 1C | <2 sec | — | — |
| 2C | >30 sec | 15 g | clean |
| 3C | <3 sec | — | — |
| 4C | >30 sec | 50 g | fairly clean |
| 5C | <3 sec | — | — |
| 6C | 30 sec | 10 g | v. clean |

TABLE 4

Percent Solids of Upper and Lower Phases of Different Waterbased Adhesives (% solids tested after 1 day and after 5 days to allow for settling/creaming)

| Adhesive Sample | Description | Upper/Lower | % solids-1 day | % solids-5 day |
|---|---|---|---|---|
| 1 | 6C (Example 3) | Upper | 34.54 | 58.27 |
| | | Lower | 28.55 | 22.4 |
| 2 | no thickener (Example 3 without TC) | Upper | 67.91 | 70.11 |
| | | Lower | 8.3 | 6.74 |
| 3 | no surfactant (Example 3 without NISA) | Upper | 61.91 | 65.43 |
| | | Lower | 4.7 | 6.23 |
| 4 | less thickener (Example 3 with 0.5 wt % TC) | Upper | 46.49 | 67.95 |
| | | Lower | 5.27 | 6.72 |
| 5 | less surfactant (Example 3 with 0.5 wt % NISA) | Upper | 45.89 | 66.99 |
| | | Lower | 45.28 | 3.43 |
| 6 | no thickener no surfactant (Example 3 without TC or NISA) | Upper | 75.28 | 68.28 |
| | | Lower | 4.71 | 6.12 |

Various modifications and alterations of this invention will become apparent to those skilled in the art without departing from the scope and principles of this invention, and it should be understood that this invention is not be unduly limited to the illustrative embodiments set forth hereinabove. All publications and patents are incorporated herein by reference to the same extent as if each individual publication or patent was specifically and individually indicated to be incorporated by reference.

What is claimed:

1. A waterbased adhesive composition comprising a mixture:

(a) an aqueous concentrate of solid, inherently tacky, elastomeric, infusible polymeric microspheres, and (b) an aqueous, acrylic pressure sensitive adhesive binder, the ratio, on a solids basis, of the microspheres to the binder being from 4 to 1 to 7000 to 1, and (c) from 0.01 to 5.0 wt % of a surfactant, and (d) from 0.01 to 3.0 wt % of a viscosifier.

2. The waterbased adhesive according to claim 1, wherein the overall % solids ranges from 20–60%.

3. The water based adhesive composition according to claim 1 wherein the composition comprises:

(a) 60–65 weight % of polymeric microspheres,
(b) 0.01–25 weight % of acrylic latex binder,
(c) 0.01–5.0 weight % of surfactant,
(d) 0.01–3.0 weight % of a viscosifier, and
(e) de-ionized water in an amount sufficient to make the weight % of the water based adhesive composition equal to 100 weight %.

4. The water based adhesive composition according to claim 1 comprising:

(a) 60–65 weight % of polymeric microspheres,
(b) 2–5 weight % of acrylic latex binder,
(c) 0.1–1.5 weight % of surfactant,
(d) 0.1–1.5 weight % of a viscosifier, and
(e) de-ionized water in an amount sufficient to make the weight % of the water based adhesive equal to 100 weight %.

5. The water based adhesive composition according to claim 1 wherein the adhesive has a viscosity in the range of 400 to 100 centipoise, such that the water based adhesive composition wets outs a low energy carrier belt but does not flow down the low energy intermediate carrier belt.

* * * * *